(12) United States Patent
Kake

(10) Patent No.: US 8,622,833 B2
(45) Date of Patent: Jan. 7, 2014

(54) USER INTERFACE APPARATUS AND OPERATIONAL SENSITIVITY ADJUSTING METHOD

(75) Inventor: Tomokazu Kake, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1377 days.

(21) Appl. No.: 11/768,306

(22) Filed: Jun. 26, 2007

(65) Prior Publication Data
US 2008/0009332 A1  Jan. 10, 2008

(30) Foreign Application Priority Data

Jul. 4, 2006  (JP) .................................. 2006-184505

(51) Int. Cl.
*A63F 9/24* (2006.01)
*A63F 13/00* (2006.01)

(52) U.S. Cl.
USPC ......... 463/37; 463/7; 463/36; 463/38; 463/39

(58) Field of Classification Search
USPC ................................. 463/7, 36–39
See application file for complete search history.

(56) References Cited

U.S. PATENT DOCUMENTS

| | | | | |
|---|---|---|---|---|
| 6,053,814 A | * | 4/2000 | Pchenitchnikov et al. | 463/36 |
| 6,203,432 B1 | * | 3/2001 | Roberts et al. | 463/37 |
| 2004/0130524 A1 | * | 7/2004 | Matsui | 345/156 |
| 2005/0212757 A1 | * | 9/2005 | Marvit et al. | 345/156 |
| 2005/0255918 A1 | * | 11/2005 | Riggs et al. | 463/37 |
| 2006/0017692 A1 | * | 1/2006 | Wehrenberg et al. | 345/156 |
| 2008/0318692 A1 | * | 12/2008 | Dohta | 463/43 |

FOREIGN PATENT DOCUMENTS

JP  11-099284  4/1999

* cited by examiner

*Primary Examiner* — Arthur O. Hall
*Assistant Examiner* — Jasson Yoo
(74) *Attorney, Agent, or Firm* — Katten Muchin Rosenman LLP

(57) ABSTRACT

A controller interface processor of a user interface apparatus acquires the tilt of a game controller as a rotational value from a sensor built in the game controller. An operation amount determining unit selects a sensitivity characteristic pattern from a plurality of sensitivity characteristic patterns different in the reaction sensitivity of an operation amount with respect to the rotational value in accordance with the width of a range of the rotational value, refers to the selected sensitivity characteristic pattern, and determines the operation amount corresponding to the rotational value acquired.

14 Claims, 12 Drawing Sheets

USER INTERFACE APPARATUS AND OPERATIONAL SENSITIVITY ADJUSTING METHOD

BACKGROUND OF THE INVENTION

1. Field of the Invention

The present invention relates to user interface techniques and, in particular, to a technique for adjusting user's feel of operation.

2. Description of the Related Art

Enjoying a computer game on a portable game console seems to be common, not to mention on a set-top game console. A user generally makes full use of plural input buttons to play a computer game (hereinafter, a user interface by means of button input is referred to as "button interface"). In recent years, with the advancements of the computer games, the button interfaces have become more complicated and make the operation of the game difficult. In addition, there is a problem that some space must be allocated for providing buttons in a small-sized game controller.

In order to address the above problem of the button interface, attention is being focused on a user interface using the movement of the game controller or the movement of the portable game console itself, as an input (hereinafter, referred to as "body interface"). For instance, an acceleration sensor built in a game controller detects the movement of the game controller. Then, the magnitude of the movement of the game controller itself is reflected on the movement of a game character. The body interface has an advantage in being intuitive and easy to understand.

Patent Document 1: Japanese Patent Application Publication No. 11-099284

It is to be noted that the body interface is not almighty. This is because the user's intention does not always correspond to the movement of the game controller. For example, a right-handed user may tend to tilt the game controller to the right. Some users are able to move the game controller in a stable manner, but others are not good at it. The inventor of the present invention found a drawback that the body interface that should convey the user's movement properly does not always convey the user's intention properly to the game.

SUMMARY OF THE INVENTION

The present invention has been made in view of the inventor's recognition of the problem, and has a general purpose of providing a body interface that can convey the user's intension appropriately.

An aspect of the present invention provides a user interface apparatus including a sensor adapted to detect a magnitude of a movement of an object so as to convert the movement of a user's hand into an operation amount from an input device for transferring the movement of the user's hand holding a device main body as the operation amount.

This apparatus acquires a detected value of the sensor from the input device, selects a sensitivity characteristic pattern from a plurality of sensitivity characteristic patterns different in reaction sensitivity of the operation amount with respect to the detected value, refers to the selected sensitivity characteristic pattern, and determines the operation amount corresponding to the detected value acquired.

With such a processing method, a conversion rule for converting the detected value into the operation amount according to the detected value of the sensor is switched. This allows the adjustment of the operational sensitivity in accordance with the user's operation. The aforementioned sensitivity characteristic pattern described herein may be a data table in which the detected value and the operation amount are previously associated with each other. Alternatively, the sensitivity characteristic pattern may be a formula or rule to convert the detected value into the operation amount, in other words, algorithm.

Optional combinations of the aforementioned constituting elements, and implementations of the invention in the form of methods, processors, apparatuses, systems, recording mediums, computer programs, data structures, etc. may also be practiced as additional may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
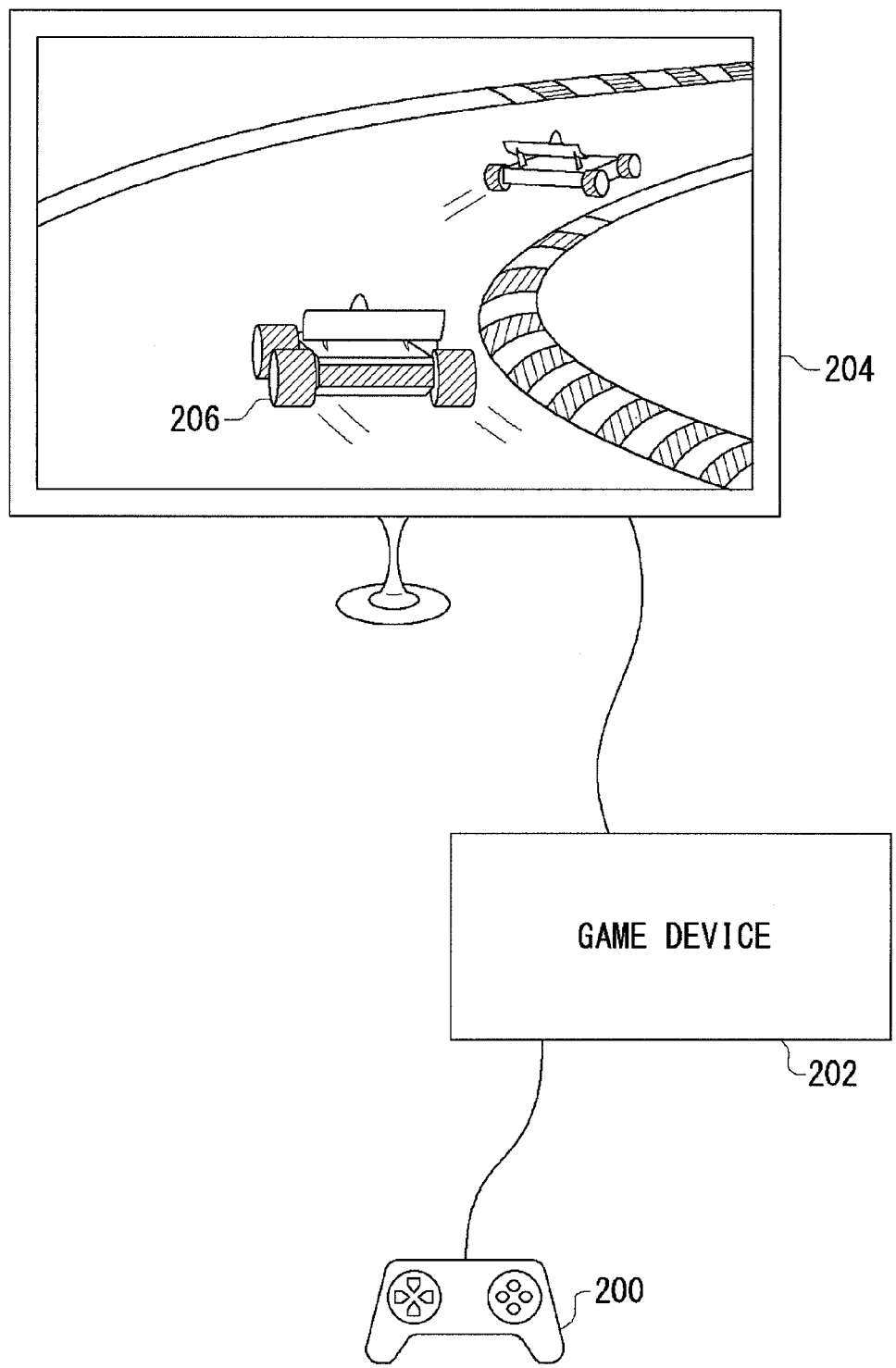
FIG. 1 schematically shows an execution environment of a computer game according to an embodiment of the present invention.

FIG. 1 schematically shows an execution environment of a computer game according to an embodiment of the present invention.

A game device 202 is a desktop game console. The game device 202 reads out a program for a computer game from a storage medium such as a DVD-ROM (Digital Versatile Disk-ROM) or CD-ROM, and then executes the program. A monitor 204 is a common TV monitor and connected to the game device 202. The monitor 204 receives an image signal from the game device 202, and displays game images. A game controller 200 serves as an input device operated by a user to play the computer game, and is connected to the game device 202. Hereinafter, a description will be given of a racing game as an example. A user operates a user object 206, which functions as a user's own vehicle, via the game controller 200.

The game controller 200 is provided with common input buttons and a built-in acceleration sensor for sensing the movement of the game controller 200. When the user tilts the game controller 200 forward or backward or to the left or to the right, the acceleration thereof is transferred to the game device 202 as an operating signal. In this manner, the game controller 200 is provided with both button interface functionality and body interface functionality. In the description below, however, the button interface functionality will be mainly discussed.

Figure 2:
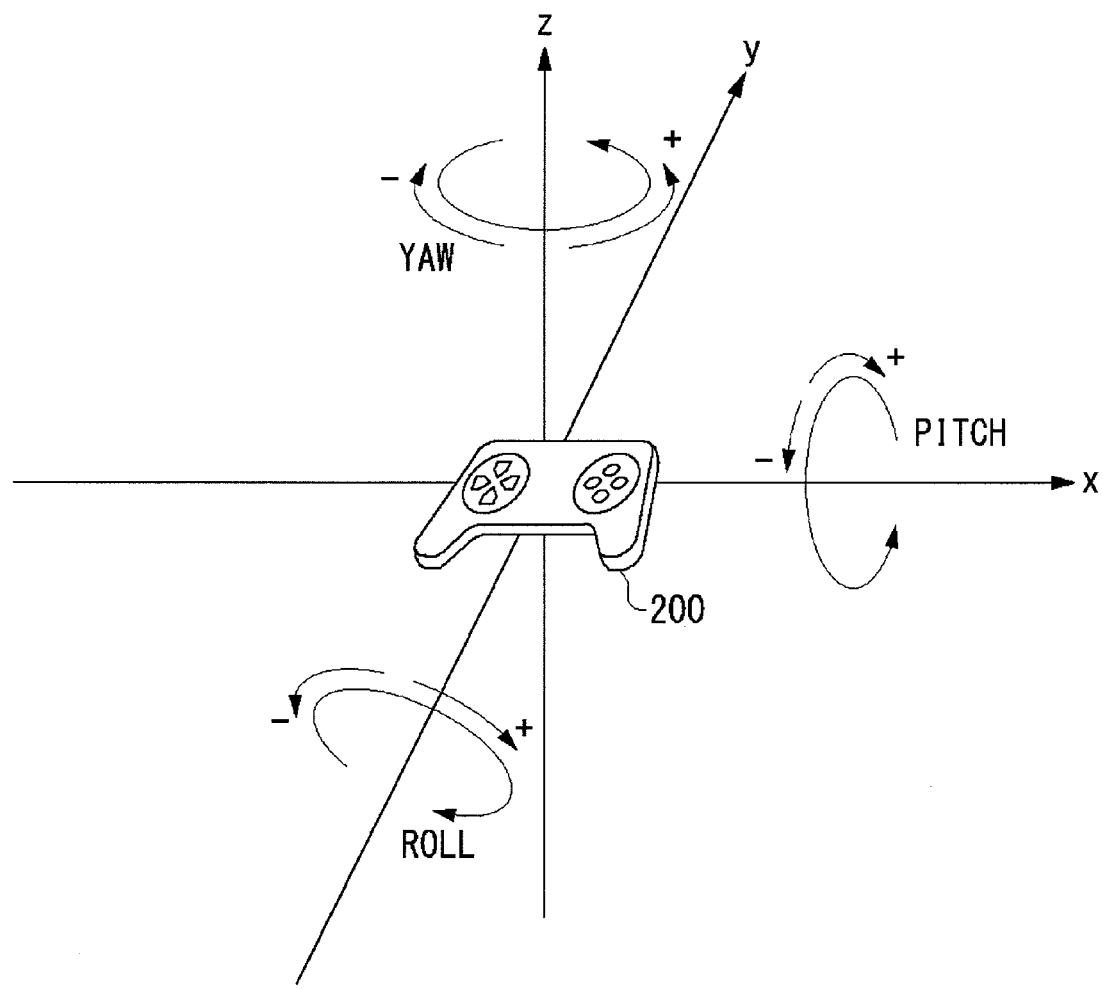
FIG. 2 schematically shows a coordinate system with a game controller located at the center thereof.

FIG. 2 schematically shows a coordinate system with the game controller 200 located at the center.

A rectangular coordinate system composed of an x-axis, a y-axis, and a z-axis is virtually provided with the game controller 200 located at the center thereof. The rectangular coordinate system is a local coordinate system that changes its orientation in accordance with the movement of the game controller 200. Each of the axes will now be described.

(x-axis: Pitch)

When viewed from a user holding the game controller 200, the x-axis is virtually configured to lie in a direction from left to right. "Pitch angle" means an angle rotating forward or backward about the x-axis.

(y-axis: Roll)

When viewed from the user holding the game controller 200, the y-axis is virtually configured in a direction from back to front. "Roll angle" means an angle rotating to the right or to the left about the y-axis.

(z-axis: Yaw)

When viewed from the user holding the game controller 200, the y-axis is virtually configured in a direction from below to above. "Yaw angle" means an angle rotating to the right or to the left about the z-axis.

The game controller 200 includes: an acceleration sensor for detecting accelerations of three axial directions; and a gyro sensor for detecting a rotational motion about the z-axis, namely, an angular velocity of the yawing motion. The acceleration sensor includes: a weight; a beam supporting the weight; and a piezoresistive element formed on the beam. The movement of the game controller 200 is transferred to the weight. The movement of the weight distorts the beam, and this distortion is detected as a change in the resistance value of the piezoresistive element. By use of the known piezoresistive technique, each of the accelerations in the directions of the x-axis, the y-axis, and the z-axis is respectively detected. The gyro sensor detects the rotational motion of an object, as a change in voltage of a piezoelectric vibrator. As stated, the acceleration sensor and the gyro sensor are general-purpose sensors that employ the known sensing techniques. Hereinafter, the acceleration of the x-axis direction will be referred to as "x acceleration". Similarly, the acceleration of the y-axis direction and that of the z-axis direction will be referred to as "y acceleration" and "z acceleration", respectively.

The x acceleration detected by the built-in sensor of the game controller 200 is converted into a digital value ranging from 0 to 255 (hereinafter, referred to as "x acceleration value"), and is transferred as an operating signal. The x acceleration value in the positive direction of the x-axis ranges from "127 to 255", and the x acceleration value in the negative direction of the x-axis ranges from "0 to 127". Y acceleration and z acceleration also have ranges in the same manner, respectively, and are transferred as y acceleration value and z acceleration value, respectively. Also, the angular velocity detected by the gyro sensor is converted into a digital value ranging from 0 to 255 (hereinafter, referred to as "angular velocity value"), and is transferred as an operating signal. In this manner, four types of digital values including the x acceleration value, the y acceleration value, the z acceleration value, and the angular velocity value are transferred as an operating signal which is an information relating to the body interface of the game controller 200.

Figure 3:
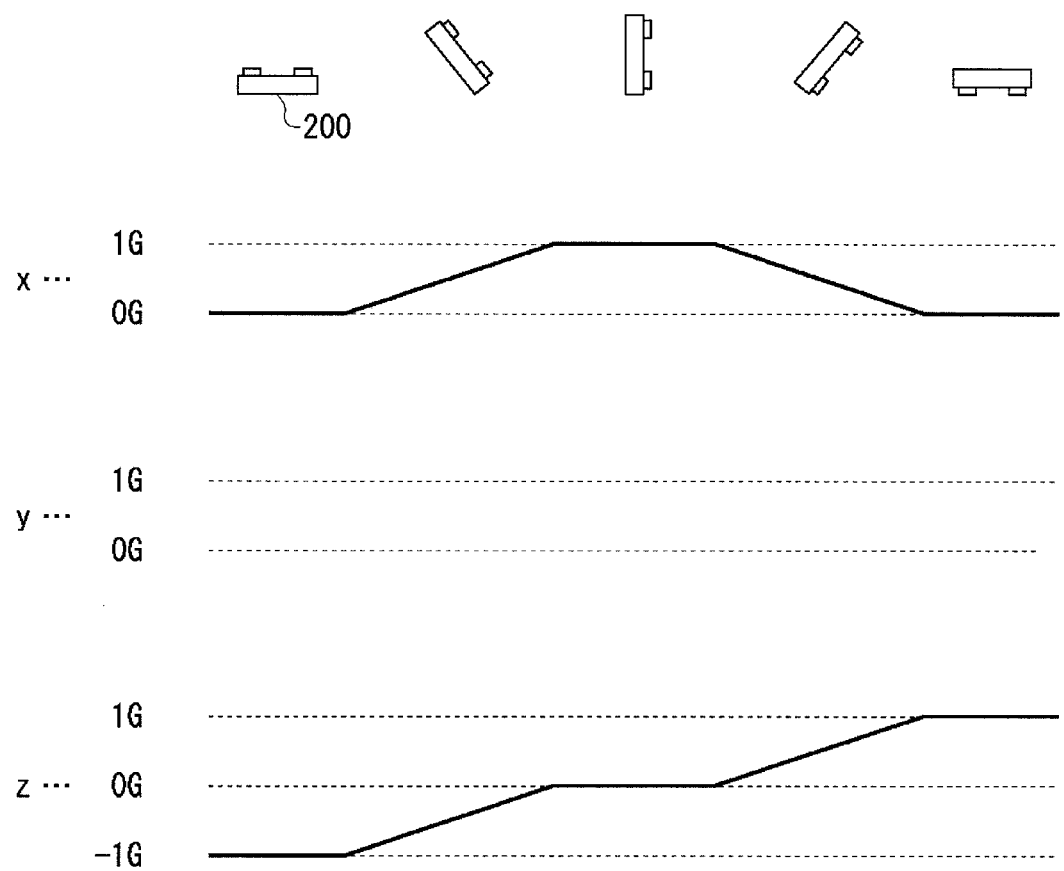
FIG. 3 schematically shows the relationship between acceleration and rotational angle.

FIG. 3 schematically shows the relationship between acceleration and rotational angle.

As shown in the figure, when the game controller 200 assumes a basic orientation, the x acceleration is 0 G, the y acceleration is 0 G, and the z acceleration is −1 G (where G represents gravity acceleration). When the game controller 200 makes a rolling motion, the x acceleration and z acceleration increase, although the y acceleration does not change. When the rolling motion angle of the game controller 200 exceeds 90 degrees and the game controller 200 starts rotating in the reverse direction, the x acceleration starts decreasing, whereas the z acceleration further increases.

Similarly, even when the pitch angle or the yaw angle changes, the gravity applied in the x-axis direction does not change. However, when the roll angle changes, the x-axis is no longer parallel to the ground surface and the x acceleration value increases. The y acceleration value is changed by the pitching motion, although the y acceleration value is not changed by the roll angle or the yaw angle. The z acceleration value is changed by the roll angle or the pitch angle, although the z acceleration value is not changed by the yaw angle. Since it is actually difficult to specify the yaw angle based on the x, y, or z acceleration value, the yaw angle is determined based on the angular velocity value of the gyro sensor.

With respect to the racing game described in the present embodiment, the rolling motion changes the x acceleration value to cause the user object 206 to move to the left or to the right. The roll angle simulates the rotational angle of the wheel. Also, the moving speed of the user object 206 can be adjusted by the pitch angle. The pitch angle simulates the depression amount of the accelerator or that of the brake. When the game controller 200 is tilted forward and the y acceleration is increased, it means that the accelerator is pressed and the speed of the user object 206 is accelerated. Conversely, when the game controller 200 is tilted backward and the y acceleration is decreased; to put in other words, when the y acceleration is increased in the reverse direction of y-axis, it means that the brake is pressed and the speed of the user object 206 is decelerated. The button interface such as cross buttons or what is called an analog stick is an input interface for transferring the movement of the user's finger to the user object 206. Meanwhile, the body interface according to the present embodiment allows a user to operate the user object 206 by using the user's wrist or the user's entire body. Such user interface is more intuitive, therefore allowing the user to be absorbed in the game environment with ease.

In the description below, the x acceleration value and the y acceleration value will be mainly discussed, and controlling by means of the z acceleration value or the angular velocity value will not be mentioned particularly. The control method discussed below by use of the x acceleration value and the y acceleration value involves the principle that is basically same as that of the control method by use of the z acceleration value or the angular velocity value. Shooting games and flight simulation games are considered to be examples of the game type that uses not only the x acceleration value and the y acceleration value but also the z acceleration value and the angular velocity value. In a shooting game, the user interface may be configured such that the object is moved forward or backward or to the left or to the right by the x acceleration value and the y acceleration value and the direction of the gun muzzle is changed by the z acceleration value or the angular velocity value. In a flight simulation game, the user interface may be configured such that the object is made to change the orientation thereof based upon the change in the angular velocity value but the displayed position thereof is not changed.

The x acceleration value and the y acceleration value that have been detected by the game controller 200 are transmitted to the game device 202 as operating signals on a regular basis. The above acceleration values are respectively converted into an operation amount by a user interface apparatus 100, described later, in the game device 202. Hereinafter, the operation amount into which the x acceleration value is converted will be referred to as "x operation amount". The y acceleration value, the z acceleration value, and the angular velocity value are respectively converted into "y operation amount", "z operation amount", and "angular velocity operation amount". The operation amount is a parameter representing the magnitude of the force to be exerted on the user object 206 that is operated in the game environment. Each of the operation amounts in the present embodiment has a numeric value ranging from "0 to 255".

For instance, it is assumed that the game controller 200 makes a rolling motion to the right and the x acceleration value "+190" is detected. It is also assumed that the x acceleration value "+190" is converted into the x operation amount of "+110" according to a given conversion rule. In this case, the game software determines the moving direction of the user object 206 in accordance with the x operation amount of "+110". In this manner, the movement of the main body of the game controller 200 is transferred to the user object 206. The conversion rule for determining the operation amount based on the acceleration value is defined as "sensitivity characteristic pattern" described in detail with reference to FIG. 7A and subsequent figures. In the above example, the x acceleration value "+190" is associated with the x operation amount of "+110" in the sensitivity characteristic pattern, as will be described later in detail.

Figure 4:
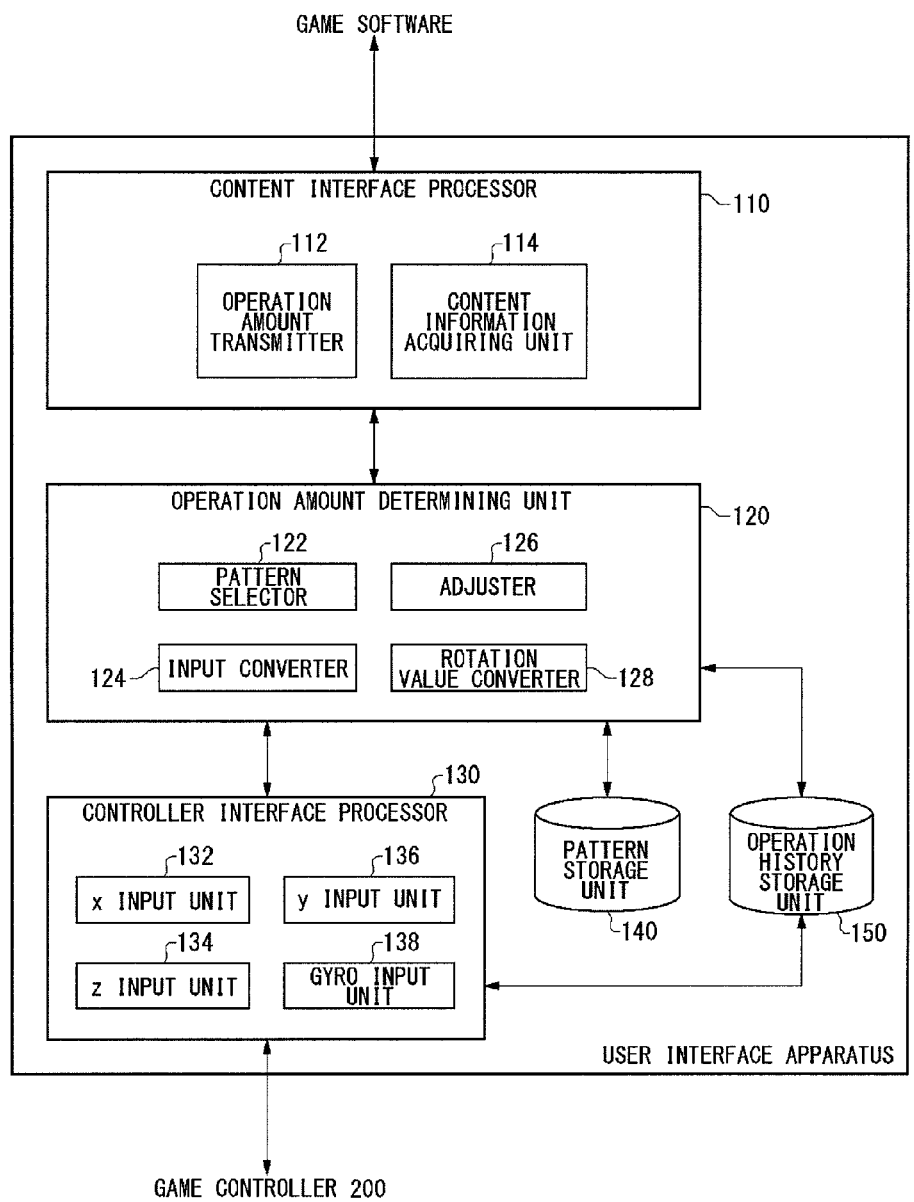
FIG. 4 is a functional block diagram of a user interface apparatus.

FIG. 4 is a functional block diagram of the user interface apparatus 100.

Each block shown in the figure can be achieved by an element such as a CPU of a computer or a mechanical device in terms of hardware, and can be achieved by a computer program or the like in terms of software. The figure shows functional blocks achieved by the cooperation thereof. It will be understood by those skilled in the art that the functional blocks can be achieved in various manners by combinations of hardware and software.

Herein, the functions to be performed by each block and advantageous effects thereof will be discussed with reference to FIG. 5A and subsequent figures.

The user interface apparatus 100 may be implemented as a software module which acquires the acceleration values and the angular velocity value from the game controller 200, determines the operation amounts, respectively, corresponding to the acceleration values and the angular velocity value based on the acquired acceleration values and the angular velocity value, and transmits the operation amounts to a controlling part of the game device 202. The user interface apparatus 100 may be provided in a library format such as, for example, Dynamic Link Library (DLL). The user interface apparatus 100 may be stored as a portion of game software in a DVD, or may be provided as middleware of the game device 202. Alternatively, the user interface apparatus 100 may be mounted in the game controller 200 so as to convert the acceleration values and the angular velocity value into the operation amounts respectively and then transfer the operation amounts to the game device 202.

The user interface apparatus 100 according to the present embodiment is a software module provided as middleware of the game device 202. Of various operating signals fed to the game device 202 from the game controller 200, the user interface apparatus 100 acquires the x acceleration value, the y acceleration value, the z acceleration value, and the angular velocity value. Then, the user interface apparatus 100 converts the above acceleration values and the angular velocity value into the operation amounts respectively, and provides the operation amounts as the parameters to be processed by the game software.

The user interface apparatus 100 includes: a content interface processor 110; an operation amount determining unit 120; a controller interface processor 130; a pattern storage unit 140; and an operation history storage unit 150.

The content interface processor 110 serves as an interface with the game software executed on the game device 202. The controller interface processor 130 serves as an interface with the game controller 200. The operation amount determining unit 120 determines the operation amount based on the acceleration values and the angular velocity value that have been detected. The operation amount determining unit 120 also serves as an interface with the content interface processor 110, the controller interface processor 130, the pattern storage unit 140, and the operation history storage unit 150.

The pattern storage unit 140 stores plural types of the sensitivity characteristic patterns that have been prepared. The operation history storage unit 150 retains operation history data representing a user's operation history.

The controller interface processor 130 includes an x input unit 132, a y input unit 136, a z input unit 134, and a gyro input unit 138. The x input unit 132 acquires the x acceleration value from the operating signal transmitted from the game controller 200. The y input unit 136 acquires the y acceleration value, the z input unit 134 acquires the z acceleration value, and the gyro input unit 138 acquires the angular velocity value detected by the gyro sensor. Each of the x input unit 132, the z input unit 134, the y input unit 136, and the gyro input unit 138 acquires the respective acceleration values and the angular velocity value on a regular basis, at predetermined time intervals of, for example, every 0.01 seconds, and then stores the values in the operation history data in the operation history storage unit 150. In the operation history data are stored the acceleration values and the angular velocity values for a given period of time in the past, for example, for the past three minutes. Hereinafter, the aforementioned period will be referred to as "history period". To put in other words, since three minutes÷0.01 (second)=18,000, the latest 18,000 x acceleration values, 18,000 y acceleration values, 18,000 z acceleration values and 18,000 angular velocity values are respectively stored. There are stored histories of changes in four detected values in total, including the x acceleration value, the y acceleration value, the z acceleration value, and the angular velocity value, respectively and separately, as the operation history data.

The operation amount determining unit 120 includes a pattern selector 122, an input converter 124, an adjuster 126, and a rotation value converter 128. The pattern selector 122 selects a sensitivity characteristic pattern from the pattern storage unit 140. A total of four sensitivity characteristic patterns are selected in accordance with the acceleration values and the angular velocity value. It should be understood that the sensitivity characteristic pattern selected for one acceleration value may be identical to that selected for another acceleration value. The input converter 124 refers to the sensitivity characteristic pattern selected, and determines the operation amount. That is to say, the input converter 124 converts the x acceleration value into the x operation amount, the y acceleration value into the y operation amount, and the z acceleration value into the z operation amount, respectively. Also, the input converter 124 converts the angular velocity value to an operation amount. The adjuster 126 adjusts the converted operation amount. The adjustment of the operation amount will be described with reference to FIG. 11A and FIG. 11B. The rotation value converter 128 determines the yaw angle, the pitch angle, and the roll angle, respectively based on the acceleration values and the angular velocity value. For example, referring back to FIG. 3, when the x acceleration value is 0.5 G and the z acceleration value is −0.5 G, the roll angle is determined to be 30 degrees.

The content interface processor 110 includes an operation amount transmitter 112 and a content information acquiring unit 114. The operation amount transmitter 112 feeds the various operation amounts determined by the operation amount determining unit 120 to the game software. The content information acquiring unit 114 acquires various types of information on the game software (hereinafter, simply referred to as "content information"). The content information is broadly categorized into two types.

The first type includes the type of game software to be executed. For instance, in an action game or a shooting game, it is desirable that the operational sensitivity be set high in order to improve the following capability of the user object 206 to the user's movement. Meanwhile, in a simulation game or an adventure game, the operational certainty is more important than the degree of the operational sensitivity. As will be described later in detail, the pattern selector 122 selects the sensitivity characteristic pattern in accordance with the type of the computer game.

The second type includes information generated from the computer game being executed. This corresponds to what is called a game event. For example, when the user object 206 is coming to a hairpin curve or when the moving speed exceeds a predetermined speed, the game software generates a unique game event. A stable driving may be supported in such a manner that the operational sensitivity is increased when the user object 206 moves at low speed and the operational sensitivity is decreased when the user object 206 moves at high speed. The content information acquiring unit 114 acquires the game event and the pattern selector 122 selects the sensitivity characteristic pattern in accordance with the game event.

Figure 5A:
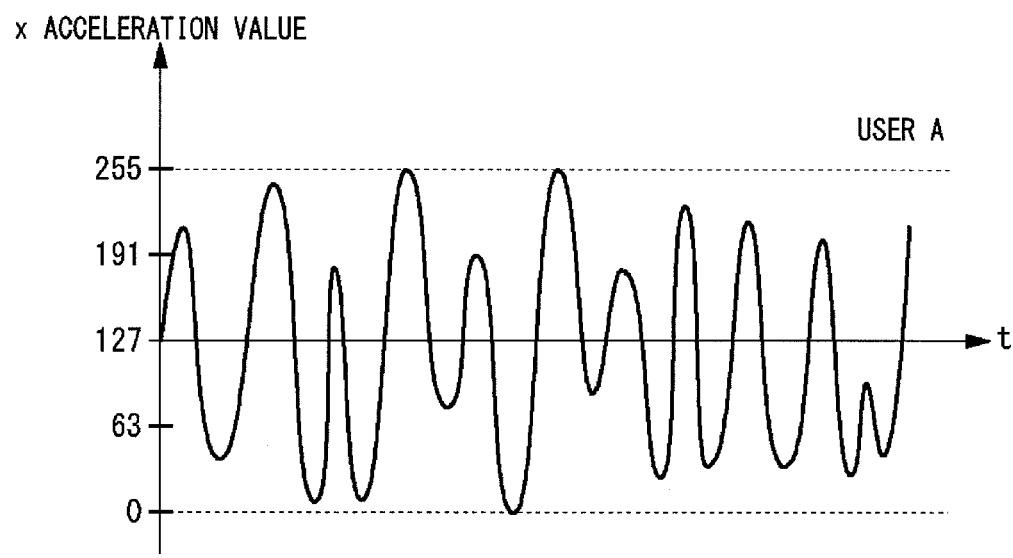
FIGS. 5A and 5B schematically show the difference in a detected x acceleration value range between users.
Figure 5B:
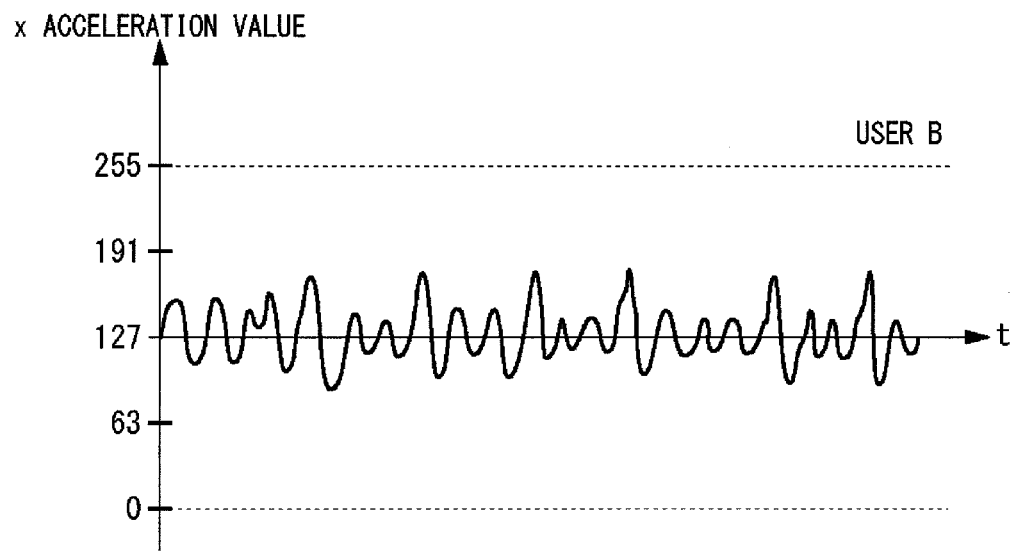

FIG. 5A and FIG. 5B schematically show the difference in the detected acceleration value range between users.

FIG. 5A is a graph of the operation history data of a user A. The horizontal axis represents time and the vertical axis represents the x acceleration value. A description will be mainly given of the x acceleration value with reference to FIG. 5A through FIG. 11B. The fundamental principle thereof is same as those of the y acceleration value, the z acceleration value, and the angular velocity value. The x input unit 132 acquires the x acceleration value on a regular basis, and stores the value in the operation history data. FIG. 5A shows that the user A is moving the game controller 200 considerably to the left and to the right. Hereinafter, the range of the x acceleration value in the operation history data will be referred to as "detected x acceleration value range". The detected x acceleration value range of the user A mostly falls within "0 to 255" in FIG. 5A.

FIG. 5B is a graph of the operation history data of another user B.

FIG. 5B shows that the user B is moving the game controller 200 little by little to the left and to the right. That is to say, the detected x acceleration value range of the user B is narrower than that of the user A. Assuming that FIG. 5A and FIG. 5B are the operation history data obtained from an identical computer game, it is likely that the user A and the user B are greatly different in their own operational ways. Accordingly, it is desirable for the user B to employ the operational characteristic in which even a small change in the x acceleration value responsively changes the x operation amount. Conversely, it is not suitable for the user A who changes the x acceleration value considerably to employ the operational characteristic in which even a small change in the x acceleration value considerably influences the x operation amount.

Figure 6A:
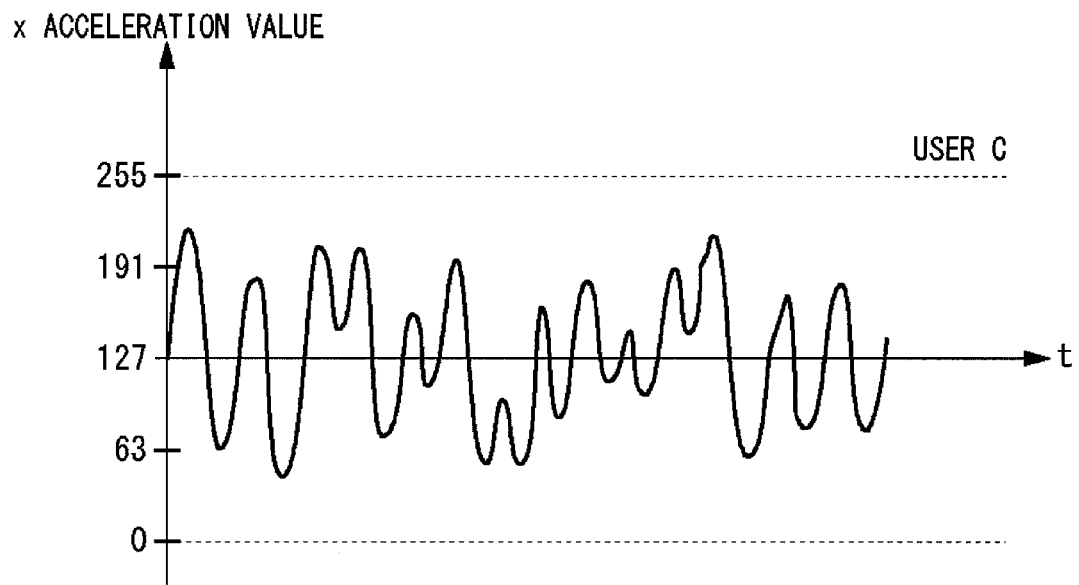
FIGS. 6A and 6B schematically show the difference in a detected x acceleration value change rate of between users.
Figure 6B:
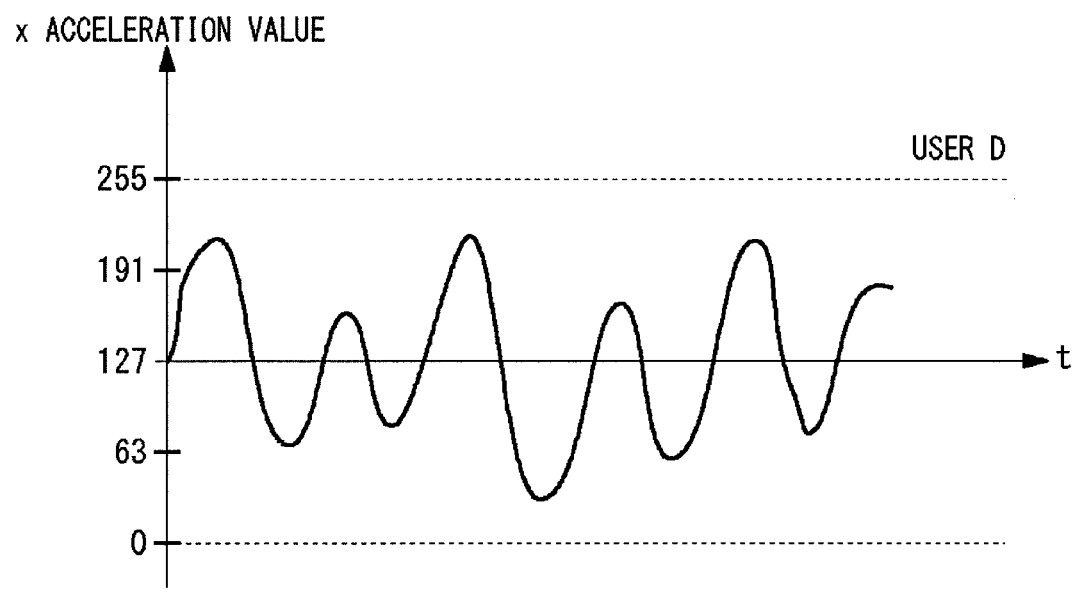

FIG. 6A and FIG. 6B schematically show the difference in a detected acceleration value change rate between users.

FIG. 6A is a graph of the operation history data of a user C. FIG. 6A shows that the user C is moving the game controller 200 frequently to the left and to the right. Hereinafter, the change rate in the x acceleration value in the operation history data will be referred to as "detected x acceleration value change rate". For example, the amount of change in the x acceleration value for 0.1 seconds at a given point of time in the history period may be defined as the detected x acceleration value change rate. FIG. 6B is a graph of the operation history data of another user D. FIG. 6B shows that the user D is slowly moving the game controller 200. That is to say, the detected x acceleration value change rate of the user D is smaller than that of the user C.

Figure 7A:
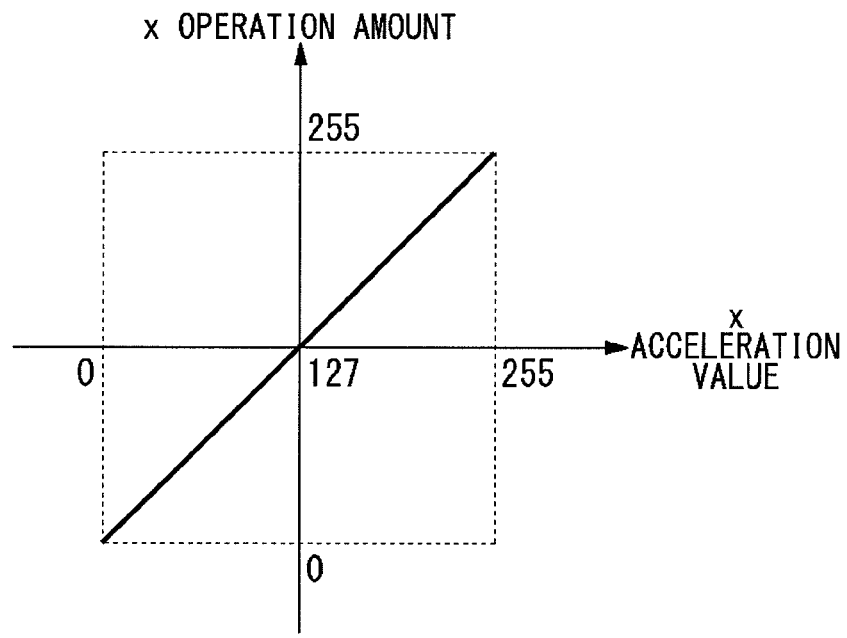
FIGS. 7A and 7B show a first example of a sensitivity characteristic pattern.
Figure 7B:
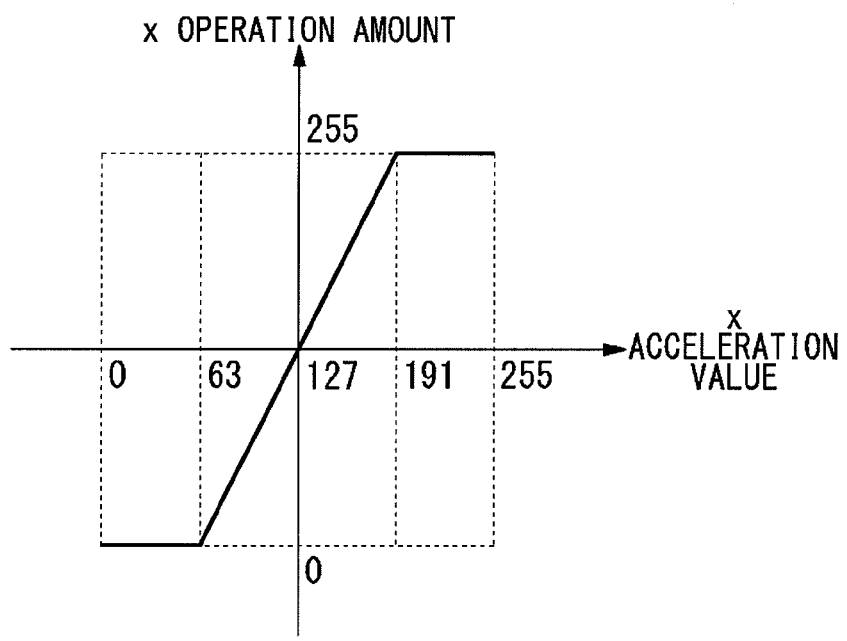

FIG. 7A and FIG. 7B show a first example of the sensitivity characteristic pattern. Graphs of FIG. 7A through FIG. 11B respectively show different sensitivity characteristic patterns that define the correspondence between the x acceleration value and the x operation amount. In the sensitivity characteristic pattern of FIG. 7A, the x acceleration value and the x operation amount are in direct proportion to each other. The maximum value "255" of the x acceleration value corresponds to the maximum value "255" of the x operation amount. Similarly, the minimum value "0" of the x acceleration value corresponds to the minimum value "0" of the x operation amount.

Also in the sensitivity characteristic pattern of FIG. 7B, the x acceleration value and the x operation amount are in direct proportion to each other. However, when the x acceleration value is equal to or greater than "191 (=255−64)", the x operation amount becomes the maximum value "255". When the x acceleration value is equal to or smaller than "63 (=127−64)", the x operation amount becomes the minimum value "0". Hereinafter, in the sensitivity characteristic patterns, shown in FIG. 7A through FIG. 10B, of monotonically increasing functions, the range of the x acceleration value that results when the x operation amount varies from the minimum value to the maximum value will be referred to as "actual x acceleration value range". In the sensitivity characteristic pattern of FIG. 7A, the actual x acceleration value range is "0 to 255". In the sensitivity characteristic pattern of FIG. 7B, the actual x acceleration value range is "63 to 191". The actual x acceleration value range in FIG. 7B is narrower than that of FIG. 7A. In addition, as the magnitude of the slope in the sensitivity characteristic pattern, what is defined is:

Actual $x$ acceleration value change rate=(maximum $x$ operation amount−minimum $x$ operation amount)/actual $x$ acceleration value range.

By comparing the above two types of the sensitivity characteristic patterns, the sensitivity characteristic pattern of FIG. 7B is greater in the actual x acceleration value change rate than that of FIG. 7A. To put in other words, the operational sensitivity is higher.

The sensitivity characteristic pattern of FIG. 7A may be applied to the user A, who has a wide detected x acceleration value range. In the sensitivity characteristic pattern of FIG. 7A, the actual wide x acceleration value range matches the detected wide x acceleration value range of the user A, thereby enabling more comfortable operability.

The sensitivity characteristic pattern of FIG. 7B may be applied to the user B. In the sensitivity characteristic pattern of FIG. 7B, the narrowness in the actual x acceleration value range matches the narrowness in the detected x acceleration value range of the user B, thereby enabling more comfortable operability.

Alternatively, from another point of view, the sensitivity characteristic pattern of FIG. 7B may be applied to the user A. When the sensitivity characteristic pattern having a narrow actual x acceleration value range as shown in FIG. 7B is applied to the user who moves the game controller 200 considerably like the user A, it is possible to guide the user A to reduce the movement of the game controller 200. Since the sensitivity characteristic pattern of FIG. 7B permits varying the x operation amount without changing the x acceleration value considerably, the user A will change the manner of operation to narrow the detected x acceleration value range.

The sensitivity characteristic pattern shown in FIG. 7A may be applied to the user who moves the game controller 200 little by little like the user B. Since the user B changes the x acceleration amount little by little, it is likely that the user B is trying to control the x operation amount finely. Therefore, by applying the sensitivity characteristic pattern by which the x operation amount gradually changes with respect to the x acceleration value as shown in FIG. 7A, the intention of the user B will be reflected on the operation with ease.

The pattern selector 122 selects the sensitivity characteristic pattern of FIG. 7A in a case where the x acceleration value exceeds a give threshold value in the operation history data, or selects the sensitivity characteristic pattern of FIG. 7B in the other cases. Alternatively, whether or not the detected x acceleration value range exceeds a given threshold value may be set as a selection condition. A sensitivity characteristic pattern may be selected according to the number of times that the x acceleration value exceeds a given threshold value during the history period. In this manner, the pattern selector 122 selects the sensitivity characteristic pattern in accordance with the width of the detected x acceleration value range in the operation history data.

The sensitivity characteristic pattern of FIG. 7B is more desirable for the user C with a large detected x acceleration value change rate than that of FIG. 7A. For the user C who changes the x acceleration value frequently and expects a quick operation, the sensitivity characteristic pattern having high operational sensitivity as shown in FIG. 7B provides the user C with more suitable operability than the sensitivity characteristic pattern having a low actual x acceleration value change rate as shown in FIG. 7A.

The sensitivity characteristic pattern of FIG. 7A is desirable for the user D who changes the x acceleration value slowly. Since the user D tends to operate the game controller 200 carefully, the user D will find it difficult to use the game controller 200, if the actual x acceleration value change rate is too large. Accordingly, in the sensitivity characteristic pattern of FIG. 7A, smallness in the actual x acceleration value change rate matches the smallness in the detected x acceleration value change rate of the user D, thereby providing more comfortable operability.

The pattern selector 122 selects the sensitivity characteristic pattern of FIG. 7B, in a case where the detected x acceleration value change rate in the operation history data exceeds a given threshold value, or selects the sensitivity characteristic pattern of FIG. 7A in the other cases. Alternatively, a sensitivity characteristic pattern may be selected according to the number of times that the detected x acceleration value change rate exceeds a given threshold value during the history period. In this manner, the pattern selector 122 selects the sensitivity characteristic pattern in accordance with the magnitude of the detected x acceleration value change rate in the operation history data.

The pattern selector 122, referring to the operation history data being updated every second, dynamically changes the sensitivity characteristic pattern. The input converter 124, referring to the sensitivity characteristic pattern, determines the x operation amount corresponding to the x acceleration value detected.

Both of FIG. 7A and FIG. 7B are point-symmetric graphs with respect to the median value "127" of the x acceleration value. However, this is not an essential condition for the sensitivity characteristic pattern. For example, the operation history data is so assumed that the x acceleration values to the right (127 to 255) tend to be greater and those to the left (0 to 127) tend to be smaller. Actually, it is desirable, in some cases, that the operation history of the x acceleration values to the right and that to the left be suitably handled separately, depending on the user's dominant arm. In such case, the pattern selector 122 may select the sensitivity characteristic pattern of FIG. 7A when the x acceleration value falls within "127 to 255", or may select that of FIG. 7B when the x acceleration value falls within "0 to 127". With this selection method, it is possible to select the preferable sensitivity character pattern in consideration of a user's physical feature. For a similar reason, the x acceleration value "127" and the x operation amount "127" need not be necessarily associated with each other. If a user tends to move the game controller 200 to the right, the operability will be further improved by associating a given x acceleration value greater than "127" with the median value "127" of the x operation amount.

In each of FIG. 5A through FIG. 6B, the median value in the detected x acceleration value range is substantially "127". In some cases, however, the median value in the detected x acceleration value range is "127" or greater, or is "127" or smaller. The adjuster 126 may adjust the sensitivity characteristic pattern so that the median value of the x acceleration value actually detected corresponds to the median value of the x operation amount.

An example is that the adjuster 126 calculates the average value of the x acceleration values during the history period as the median value of the actual x acceleration value range. It is assumed that "150" is the average value of the x acceleration values. Subsequently, the sensitivity characteristic pattern is displaced horizontally so that the average value "150" of the x acceleration values corresponds to the median value "127" of the x operation amount. Such adjustment permits the correspondence between the x operation amount and the x acceleration value to keep track of a change in the detected range of the x acceleration.

The adjuster 126 may further adjust the selected sensitivity characteristic pattern. For example, when the x acceleration value is outside the range of "63 to 191" ten times or more during the history period, the pattern selector 122 selects the sensitivity characteristic pattern of FIG. 7B. When the x acceleration value is also outside the range of "31 to 223" ten times or more, the adjuster 126 may enlarge the actual x acceleration value range of FIG. 7B from "63 to 191" to "31 to 223". In association therewith, the actual x acceleration value change rate will also be adjusted. That is to say, when the x acceleration value falls within the range of "0 to 31", the x operation amount is set to "0". When the x acceleration value falls within the range of "223 to 255", the x operation amount is set to "255". When the x acceleration value falls within the range of "31 to 223", the x operation amount varies from 0 to 255 in direct proportion to the x acceleration value.

When the sensitivity characteristic pattern is selectively changed, the correspondence of the x operation amount to the x acceleration value may not be changed instantly. It is assumed that the sensitivity characteristic pattern of FIG. 7B is selected to replace the sensitivity characteristic pattern of FIG. 7A. The adjuster 126 may change from the sensitivity characteristic pattern of FIG. 7A to the sensitivity characteristic pattern of FIG. 7B, gradually narrowing the actual x acceleration value range of FIG. 7A. Changing the sensitivity characteristic pattern slowly allows the user to get accustomed to the change in the feel of operation. The same applies to FIG. 8A and subsequent figures.

The adjuster 126 may vary the change speed of the sensitivity characteristic pattern in accordance with an instruction given from the application software. For example, in a scene where a user is demanded to perform a complex operation or a quick operation, the adjuster 126 changes the sensitivity characteristic pattern relatively slowly. This allows the user to gradually get accustomed to the change in the feel of operation. Conversely, in what is known as a static scene such as a menu selection screen, the adjuster 126 may change the sensitivity characteristic pattern relatively quickly.

The same applies to a calculating expression for determining the operation amount based on the acceleration value, as well as applying to the data table in which the sensitivity characteristic pattern predetermines the correspondence between the acceleration value and the operation amount. For instance, if the relation x operation amount=a×x acceleration value+b is satisfied, one sensitivity characteristic pattern may be changed to another by gradually changing the coefficient a or the coefficient b.

The pattern selector 122 is capable of selecting the sensitivity characteristic pattern in accordance with the type of game software to be executed. When the computer game to be executed is, for example, an action game requiring high operational sensitivity, the pattern selector 122 selects the sensitivity characteristic pattern of FIG. 7B. When the computer game to be executed is a simulation game in which the operational stability is more important than the operational sensitivity, the pattern selector 122 selects the sensitivity characteristic pattern of FIG. 7A. When the computer game to be executed is loaded onto the memory of the game device 202, the content information acquiring unit 114 receives the information representing the game type from the game software, and then the pattern selector 122 selects the corresponding sensitivity characteristic pattern. Which sensitivity characteristic pattern is to be selected by the game software may be communicated to the content information acquiring unit 114 expressly.

The pattern selector 122 may select the sensitivity characteristic pattern in accordance with the game event. In a racing game, for instance, if a user changes a tire or suspension of the user object 206, the pattern selector 122 may change the sensitivity characteristic pattern. With such selection method, it is possible to vary the feel of operation based upon the specification selected for the user object 206. Also, when the user object 206 has a high moving speed, the operational sensitivity may be decreased as shown in FIG. 7A, and when the user object 206 has a low moving speed, the operational sensitivity may be increased as shown in FIG. 7B. This allows the user to operate the user object 206 with ease. Since it is likely that importance is put on the straight movement of the user object 206 at high moving speed, the above selection method enables the operability to meet the user's intension.

Figure 8A:
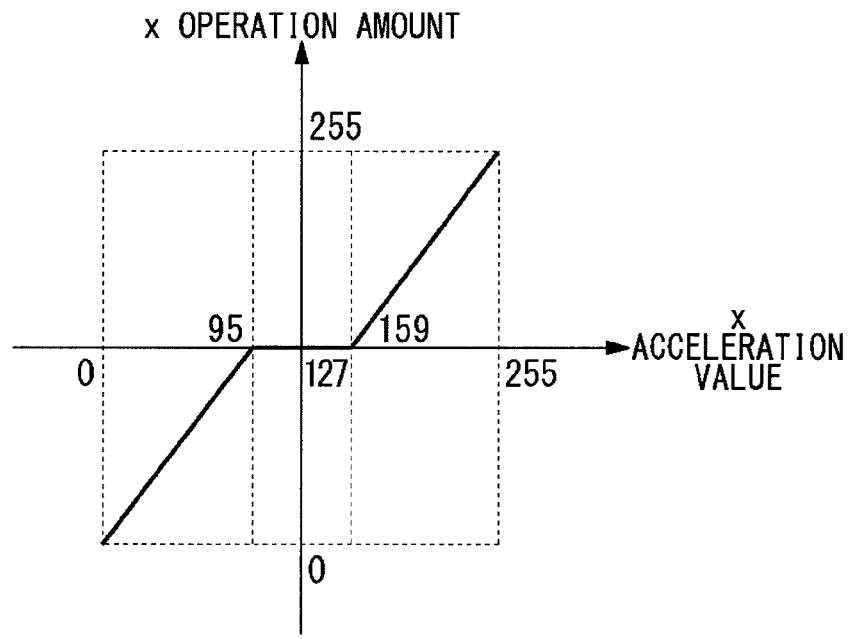
FIGS. 8A and 8B show a second example of the sensitivity characteristic pattern.
Figure 8B:
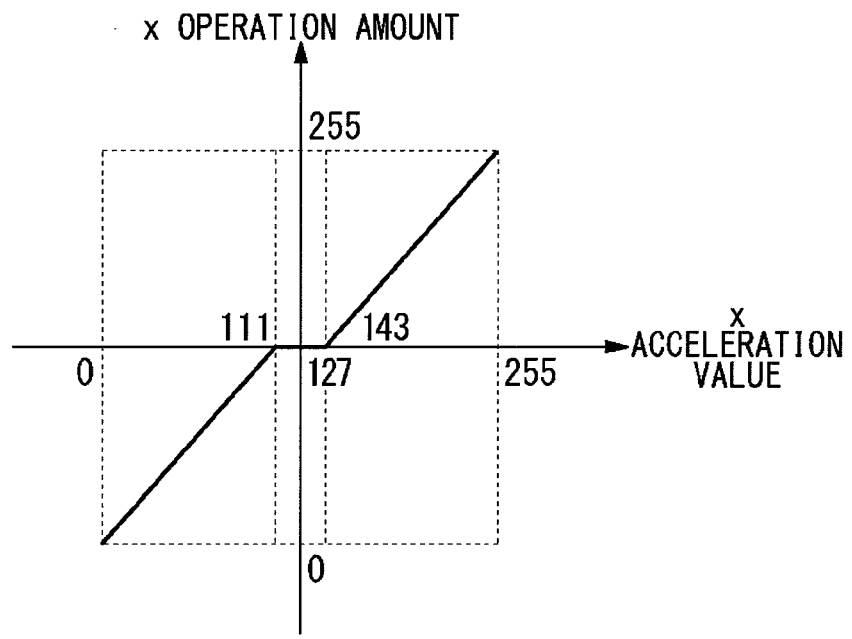

FIG. 8A and FIG. 8B are shows a second example of the sensitivity characteristic pattern. In the sensitivity characteristic pattern of FIG. 8A, when the x acceleration values falls within "95 to 159", the x operation amount does not change. Such range of the x acceleration value will be referred to as "play range". By providing the play range, the x operation amount is easily set at the median value "127". The play range of the sensitivity characteristic pattern of FIG. 8B is from "111 to 143", which is narrower than the play range of the sensitivity characteristic pattern of FIG. 8A.

The sensitivity characteristic pattern shown in FIG. 8A is more desirable for the user A with a wide detected x acceleration value range than that shown in FIG. 8B. For the user A who likes to operate considerably, it seems difficult to return the x operation amount to the neutral value "127" in a narrow range of the sensitivity characteristic pattern of FIG. 8B. Meanwhile, in the sensitivity characteristic pattern of FIG. 8A, the wide play range matches the wide detected x acceleration value range of the user A, enabling more comfortable operability.

The sensitivity characteristic pattern of FIG. 8B is desirable for the user B. Since the detected x acceleration value range of the user B is narrow, the user B will realize the slow reaction in a wide play range of the sensitivity characteristic pattern of FIG. 8A. Meanwhile, in the sensitivity characteristic pattern of FIG. 8B, narrowness in the play range matches the narrowness in the detected x acceleration value range of the user B, thereby allowing more comfortable operability. As described with reference to FIG. 7A and FIG. 7B, the pattern selector 122 selects the sensitivity characteristic pattern according to the width of the detected x acceleration value range in the operation history data.

The sensitivity characteristic pattern of FIG. 8A is more desirable for the user C with a large detected x acceleration value change rate than that of FIG. 8B. For the user C who changes the x acceleration value frequently, it is easier to stabilize the operation in the wide play range of the sensitivity characteristic pattern as shown in FIG. 8A than in the narrow play range of the sensitivity characteristic pattern as shown in FIG. 8B, allowing the user C more suitable operability.

The sensitivity characteristic pattern of FIG. 8B is desirable for the user D who changes the x acceleration value slowly. The user D tends to operate the game controller 200 carefully, so the user D is able to control the x operation amount finely. For this reason, when the play range is wide, the user D will find it difficult to operate the game controller 200 after all. In the sensitivity characteristic pattern of FIG. 8B, the narrowness in the play range matches the smallness in the detected x acceleration value change rate of user B, enabling more comfortable operability. As described with reference to FIG. 7A and FIG. 7B, the pattern selector 122 may select the sensitivity characteristic pattern according to the magnitude of the detected x acceleration value change rate in the operation history data.

The adjuster 126 may further adjust the sensitivity characteristic pattern selected. For example, when the x acceleration value has been outside the range of "63 to 191" ten times or more, the pattern selector 122 selects the sensitivity characteristic pattern of FIG. 8A. When the x acceleration value has also been outside the range of "31 to 223" ten times or more, the adjuster 126 may further enlarge the play range of FIG. 8B from "111 to 143" to "63 to 191".

The pattern selector 122 is capable of selecting the sensitivity characteristic pattern according to the type of the game software to be executed. For instance, when the computer game to be executed is an action game, the pattern selector 122 selects the sensitivity characteristic pattern of FIG. 8A, which has a large play range and allows stable operation.

Alternatively, the pattern selector 122 may select the sensitivity characteristic pattern of FIG. 8B, giving priority to the operational sensitivity.

Also, as described with reference to FIG. 7A and FIG. 7B, the pattern selector 122 may select the sensitivity characteristic pattern according to the game event. For example, when the user object 206 moves at high speed, the play range is to be enlarged. This can further stabilize the straight movement. Also, in FIG. 8A and FIG. 8B, even with the same x acceleration value, the corresponding x operation amount may be different between the direction in which the x acceleration value is increased and the direction in which it is decreased. That is to say, the operation stability can be further enhanced by setting the correspondence just like the hysteresis curve.

Both of FIG. 8A and FIG. 8B are point-symmetric graphs with respect to the median value "127" of the x acceleration value. Similarly to FIG. 7A and FIG. 7B, however, this is not an essential condition for the sensitivity characteristic pattern. In the play range, the x acceleration value of "127" is not necessarily set at the median value. For example, it is assumed that the x acceleration value to the right tends to be great and that to the left tends to be small in the operation history data. In this case, the operability will be improved by shifting the play range rightward to, for example, "107 to 171". The adjuster 126 may adjust the correspondence of the sensitivity characteristic pattern dynamically, by determining the size and position of the play range according to the width of the detected x acceleration value range or the degree of the detected x acceleration value change rate.

Instead of selecting one of the sensitivity characteristic patterns shown in FIG. 7A, FIG. 7B, FIG. 8A, and FIG. 8B, any two or more sensitivity characteristic patterns may be selected and combined. For example, the pattern selector 122 may select the sensitivity characteristic pattern of FIG. 7B and that of FIG. 8A, and then the adjuster 126 may superimpose the two sensitivity characteristic patterns to normalize the range of the x operation amount to "0 to 255". Such processing method permits generating a newly created sensitivity characteristic pattern, in which characteristics of plural sensitivity characteristic patterns are reflected.

Figure 9A:
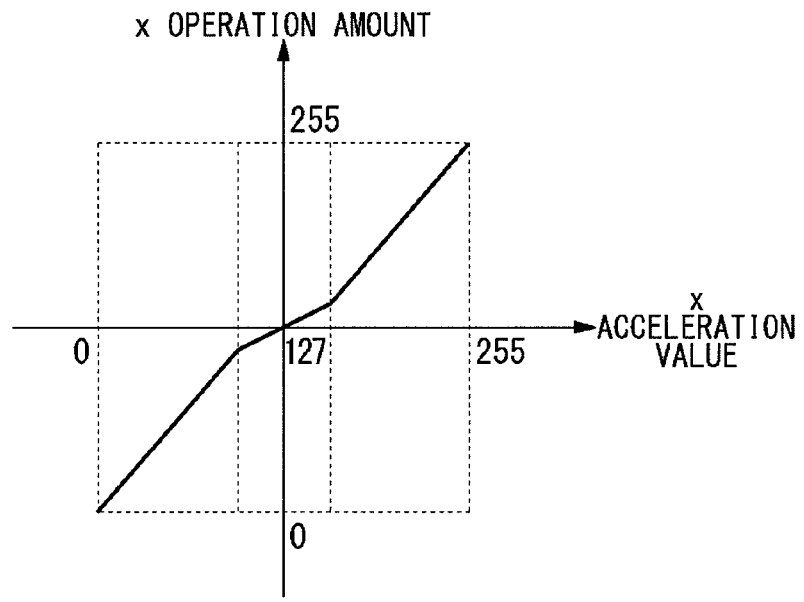
FIGS. 9A and 9B show a third example of the sensitivity characteristic pattern.
Figure 9B:
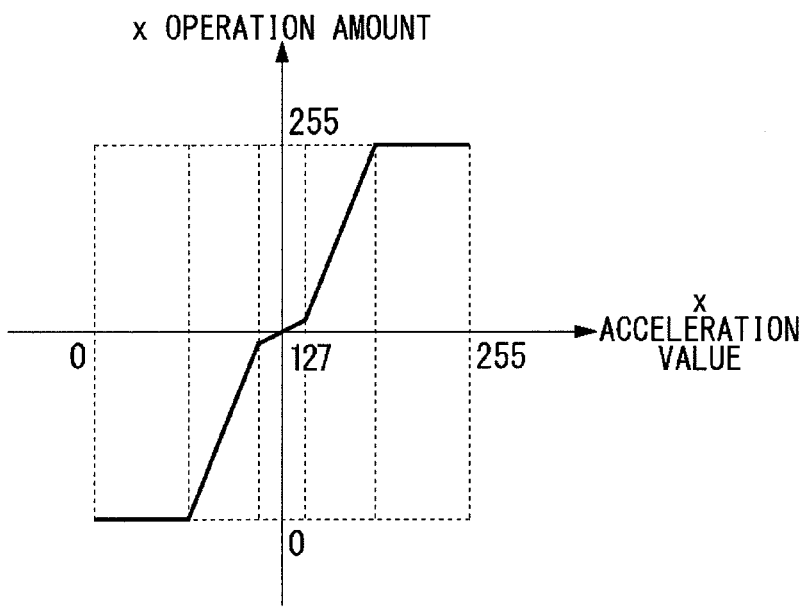

FIG. 9A and FIG. 9B show a third example of the sensitivity characteristic pattern.

Unlike FIG. 8A and FIG. 8B, the x operation amount in the play range slightly varies in the sensitivity characteristic pattern shown in FIG. 9A and FIG. 9B. The play range is not limited to the range in which the x operation amount does not change at all in spite of the change in the x acceleration value as shown in FIG. 8A and FIG. 8B, and may be a range in which the change in the x operation amount slows down as shown in FIG. 9A and FIG. 9B.

Figure 10A:
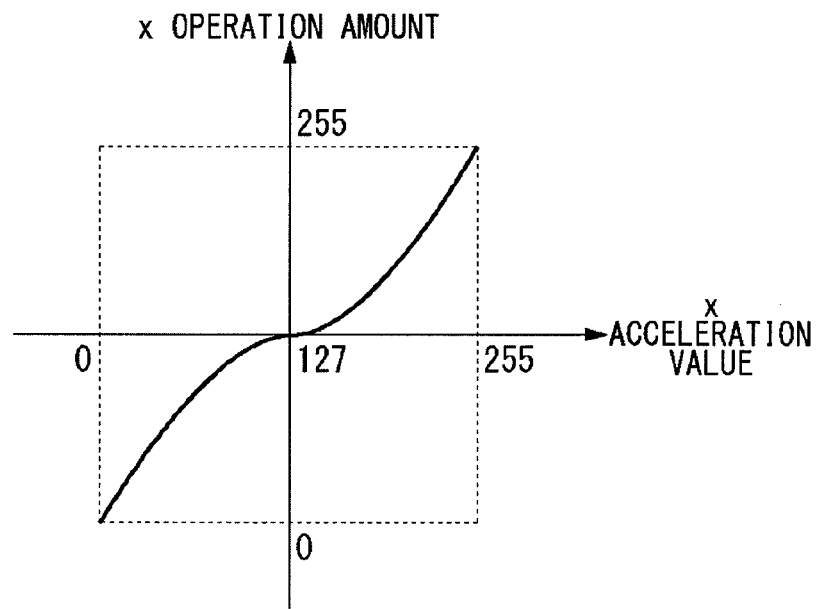
FIGS. 10A and 10B show a fourth example of the sensitivity characteristic pattern.
Figure 10B:
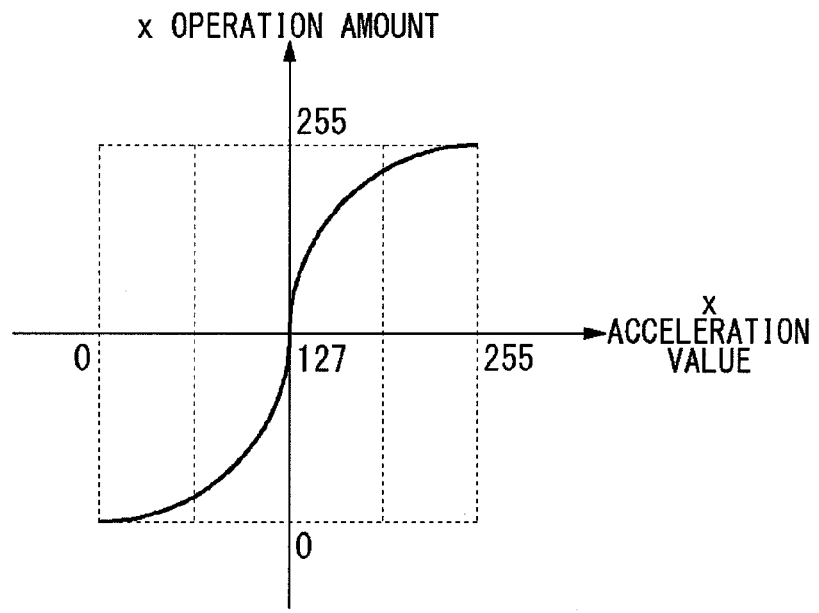

FIG. 10A and FIG. 10B show a fourth example of the sensitivity characteristic pattern.

As described with relation to FIG. 7A, etc., the x acceleration value and the x operation amount may be in a proportional relation, whereas the change rate of the x operation amount may be smooth. The increase rate of the x operation amount is small near the x acceleration value "127" in FIG. 10A. In contrast, the change rate thereof is large in FIG. 10B. It is desirable for the user A who changes the x acceleration value considerably to apply the sensitivity characteristic pattern of FIG. 10A in which the x operation amount slowly changes, and it is desirable for the user B who changes the x acceleration value little by little to apply the sensitivity characteristic pattern of FIG. 10B in which the x operation amount changes quickly.

For the user C who changes the x acceleration value frequently, it is desirable to apply the sensitivity characteristic pattern of FIG. 10A in which the x operation amount slowly changes. In addition, for the user D who changes the x acceleration value slowly and stably, it is desirable to apply the sensitivity characteristic pattern of FIG. 10B in which the x operation amount changes quickly. It should be understood that the pattern selector 122 may select any one of the sensitivity characteristic pattern of FIG. 10A and that of FIG. 10B, according to the type of the computer game to be executed or the game event.

Figure 11A:
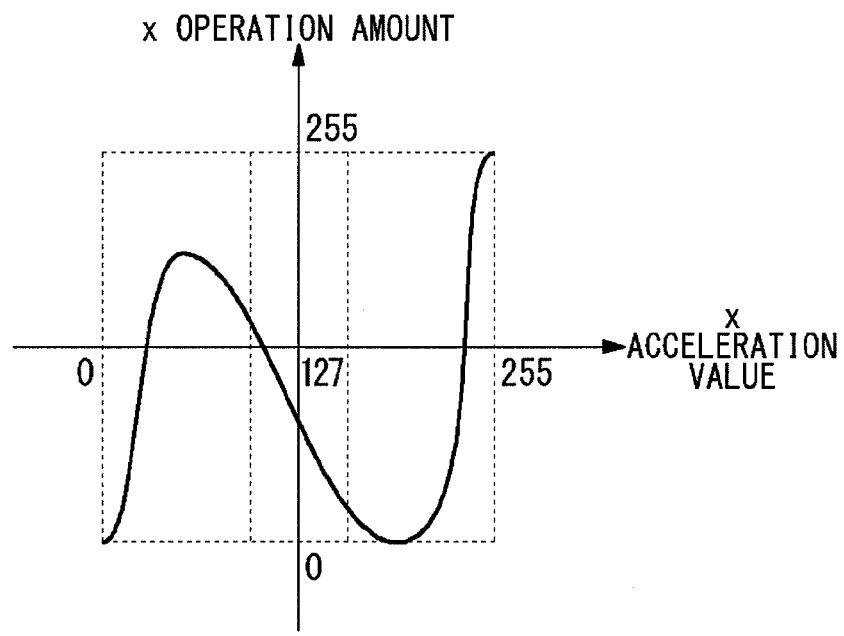
FIGS. 11A and 11B show a fifth example of the sensitivity characteristic pattern.
Figure 11B:
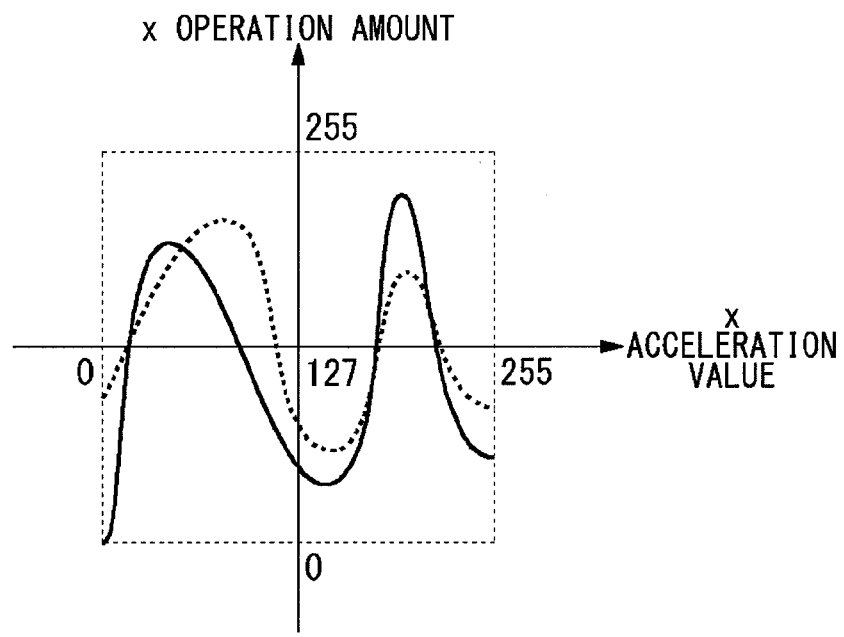

FIG. 11A and FIG. 11B show a fifth example of the sensitivity characteristic pattern.

In the sensitivity characteristic pattern of FIG. 11A and that of FIG. 11B, the x operation amount and the x acceleration value do not necessarily correspond to each other on a one-to-one basis. In the graph of FIG. 11A, the correspondence between the x acceleration value and the x operation amount presents a waveform. For instance, the sensitivity characteristic pattern of FIG. 11A may be applied to a game in which the user object 206 in a small boat is operated. Since it is difficult to set the x acceleration value for outputting a desired x operation amount, it is possible to provide the feel of operation of maintaining the balance of the user object 206 while moving the game controller 200 to the left and to the right. This causes the user to experience loose footing.

FIG. 11B shows the situation in which the sensitivity characteristic pattern represented by a solid line and that represented by a dotted line are switched on a regular basis. The feel of operation that can amuse a user can be expressed in a more realistic manner by dynamically switching plural sensitivity characteristic patterns over the time. Such feel of operation may be available, when the pattern selector 122 arbitrarily selects the plural types of the sensitivity characteristic patterns. Alternatively, such feel of operation may also be available, when the adjuster 126 dynamically adjusts the correspondence between the sensitivity characteristic patterns. For example, the dynamically changing feel of operation is available, when the adjuster 126 increases or decreases the x operation amount on a regular basis in the range from +110% to +90% in the selected sensitivity characteristic pattern.

As stated heretofore, the relation between the x acceleration value and the x operation amount is discussed. The relation between the y acceleration value and the y operation amount, and relation between the z acceleration value and the z operation amount are also determined by selecting the sensitivity characteristic pattern, respectively. Those three types of the sensitivity characteristic patterns may be commonly provided, or may be individually provided. The structure of human wrist makes it easier to change the roll angle of the human wrist considerably than to change the pitch angle thereof. For this reason, a more comfortable feel of operation is obtainable by heightening the operational sensitivity of the y acceleration value and lowering the operational sensitivity of the x acceleration value.

Figure 12:
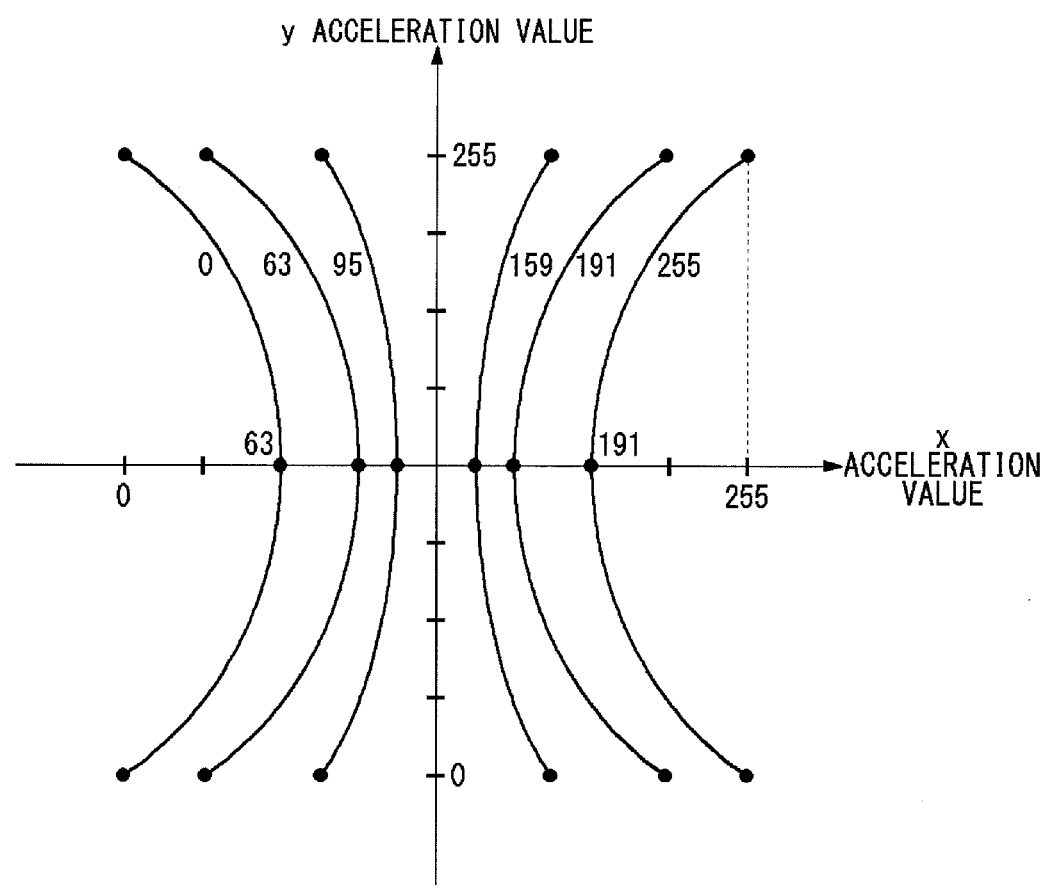
FIG. 12 shows how the correspondence between a rolling motion value and a rolling operation amount varies with respect to a pitching motion value.

FIG. 12 is a graph showing how the relation between the x acceleration value and the x operation amount is changed in accordance with the y acceleration value.

FIG. 12 shows how the correspondence between the x acceleration value and the x operation amount varies with respect to the y acceleration value. For instance, when the y acceleration value is 255 and the x acceleration value is 255, the x operation amount is 255. When the y acceleration value is 255 and the x acceleration value is 0, the x operation amount is 0. That is to say, the actual x acceleration value range falls within "0 to 255". Meanwhile, when the y acceleration value is 127 and the x acceleration value is 191, the x operation amount is 255. When the y acceleration value is 127 and the x acceleration value is 63, the x operation amount is 0. That is to say, the actual x acceleration value range falls within "63 to 191". In this way, the pattern selector 122 may select the sensitivity characteristic pattern having a different actual x acceleration value range based on the y acceleration value.

When the y acceleration value and the x acceleration value are both near 127, in other words, when the game controller 200 assumes the basic orientation, it is easy for the user to tilt the game controller 200. However, the user feels relatively constrained as the user tilts the game controller 200 forward considerably and then rolls the game controller 200. Therefore, when the y acceleration value is large or small, the operation in the direction of making a rolling motion is easily stabilized by enlarging the actual x acceleration value range.

Particularly in a racing game, when the y acceleration value is large and the moving speed of the user object 206 is high, the stability of the straight movement of the user object 206 is supported by enlarging the actual x acceleration value range in consideration of operability.

In contrast, the actual x acceleration value range occurring when the y acceleration value is "255" may be narrower than that occurring when the y acceleration value is "127". With such processing method, the operational sensitivity in a constrained orientation can be increased more than that in the basic orientation. Which actual x acceleration value range is selected at which y acceleration value may be determined in accordance with the type of the computer game to be executed or the execution status thereof.

It is assumed that the user tilts the game controller 200 forward considerably in an application for moving an operation target in a three-dimensional space (e.g., in operating an object such as an airplane or submarine that can be navigated in three dimensions). At this time, it can be said that the user's "will to move the operation target straight ahead" is represented as "considerable forward tilt of the game controller 200". In this case, the movement to the left or to the right is not important for the user, or it can even be considered that it is undesirable for the user, as compared to the forward movement of the operation target. Therefore, the operability in which the user's intension is reflected is achieved by reducing the operational sensitivity with respect to the roll angle as the pitch angle of the game controller 200 becomes larger. With such processing method, the operability can be provided in such a manner that the user's intension speculated from a first operation amount is taken into consideration to adjust the operational sensitivity with respect to a second operation amount.

As stated heretofore, the user interface apparatus 100 according to the present embodiment is capable of enhancing the operability of the body interface.

In the case of the x acceleration value that is mainly discussed in the present embodiment, factors that change the sensitivity characteristic of the x operation amount with respect to the x acceleration value are listed below. Figures in the following parentheses represent the related figures herein.

1. Detected x acceleration value range (FIG. 5A, FIG. 5B);
2. Detected x acceleration value change rate (FIG. 6A, FIG. 6B);
3. Type of computer game to be executed;
4. Game event of computer game;
5. Moving speed of the user object 206;
6. Time passage (FIG. 11A, FIG. 11B); and
7. Acceleration value other than x acceleration value (FIG. 12).

The sensitivity characteristic of the x operation amount with respect to the x acceleration value affects the following:

1. Actual x acceleration value range (FIG. 7A, FIG. 7B);
2. Actual x acceleration value change rate (FIG. 7A, FIG. 7B, FIG. 10A, FIG. 10B); and
3. Play range (FIG. 8A, FIG. 8B, FIG. 9A, FIG. 9B).

In the present embodiment, the description is given of the process for determining the operation amount based upon the acceleration value; however, the present invention is not limited thereto. For example, the operation amount may be determined from the yaw angle detected by the gyro sensor. Alternatively, the roll angle or the pitch angle may be detected from the x acceleration value, the y acceleration value, and the z acceleration value, according to the principle described with reference to FIG. 3. The rotation value converter 128 converts the yaw angle, the pitch angle, the roll angle, into digital values ranging from "0 to 255", respectively, based upon the x acceleration value, the y acceleration value, the z acceleration value, and the angular velocity value. The sensitivity characteristic pattern may be a pattern for defining the correspondence between the above rotational angles and the operation amount. In this case, the input converter 124 refers to the calculated roll angles and the sensitivity characteristic pattern to determine the operation amount. In this way, the operation amount may be determined based upon the rotational angle specified from the acceleration value, instead of the acceleration value detected by the sensor of the game controller 200. In the case of FIG. 12, the correspondence between the rolling motion angle and the operation amount may be adjusted in accordance with the magnitude of the pitching motion angle.

In the interface such as a joystick, the movable range of the joystick is physically limited. Meanwhile, in the body interface in which the movement of the game controller 200 is the input, there is no substantial physical limitation. Therefore, there is the possibility that a user moves the game controller 200 in an excessively large amount. By changing the sensitivity characteristic pattern, the user is made to recognize the range in which the game controller 200 is moved implicitly and is guided for optimal operation.

Adjusting the sensitivity characteristic pattern with the above various factors provides the user with the operability suitable for the user, the content type, or the execution status. An additional benefit is that, even if the detection accuracies of the sensors included in the game controller 200 change over time, the change is automatically corrected. In the present embodiment, the description is given of the game controller 200 to be connected to the game device 202; however, the tilt of the main body of the portable game device may be detected. Also, in the present embodiment, the acceleration values, the angular velocity value, and the magnitude of the rotational angle of the game controller 200 are detected; however, the input into the body interface is not necessarily limited to the acceleration value or the tilt. The operational sensitivity control method described in the present embodiment is applicable to a case where a magnetic sensor detects the position in a space so as to determine the operation amount with the detected position being the input.

In the present embodiment, the description is mainly given of the sensitivity characteristic pattern having a given form; however, the operational sensitivity may be adjusted by the sensitivity characteristic pattern represented in a free-form curve such as Bezier curve or NURBS curve, as a modification. In addition, the operational sensitivity may be changed by varying the variable that determines the free-form curve, for example, the control point in the Bezier curve.

In the present embodiment, the description is given that the sensitivity characteristic pattern of FIG. 7A is suitable for the input pattern of FIG. 5A; however, it should be understood what type of sensitivity characteristic pattern is to be assigned to what type of input variable may arbitrarily be set in accordance with the design principle.

The description of the invention given above is based upon an embodiment. The embodiment is illustrative in nature and various variations in constituting elements and processes involved are possible. Those skilled in the art would readily appreciate that such variations are also within the scope of the present invention.

The function of an input unit described in the scope of claims is performed by the x input unit 132 or the y input unit 136 in the present embodiment. A detected value described in the scope of claims is mainly represented as the acceleration value and the rotational value in the present embodiment.

It should also be understood by those skilled in the art that each function fulfilled by each of the components described in the scope of claims is accomplished by a single unit of each functional block shown in the embodiment or by cooperation of units thereof.

Various aspects of the present invention to be encompassed by the above embodiment and variations thereof will be illustrated below, including those described in the scope of claims.

A1. An aspect of the present invention provides a user interface apparatus comprising: an input unit acquires a first detected value representing the magnitude in a first direction and a second detected value representing the magnitude in a second direction that is different from the first direction, from an input device, which includes a sensor adapted to detect a magnitude of a movement of an object and a tilt thereof and transfers the movement of a user's hand holding a device main body as an operation amount; a pattern storage unit which stores a plurality of sensitivity characteristic patterns different in reaction sensitivity of the operation amount with respect to the first detected value; and an operation amount determining unit which selects a sensitivity characteristic pattern in accordance with the second detected value, refers to the selected sensitivity characteristic pattern, and determines the operation amount corresponding to the first detected value acquired.

A2. In the user interface apparatus described in A1, the operation amount determining unit selects any one of the plurality of the sensitivity characteristic patterns different in a change rate of the operation amount with respect to a change in the first detected value.

A3. In the user interface apparatus described in A1 or A2, the operation amount determining unit selects any one of the plurality of the sensitivity characteristic patterns different in a play range in which the operation amount is not changed even when the first detected value is changed.

A4. In the user interface apparatus described in A1, the sensor included in the input device is adapted to detect the magnitude of a rotational angle about a first given axis of the input device and the magnitude of the rotational angle about a second given axis of the input device, respectively; and the input unit acquires the magnitude of the rotational angle about the first given axis of the input device as a first detected value and the magnitude of the rotational angle about the second given axis of the input device as a second detected value, respectively.

A5. In the user interface apparatus described in A4, the input unit acquires the magnitude of the rotational angle as the second detected value when the input device is tilted forward or backward as viewed from a user holding the input device.

A6. In the user interface apparatus described in A4 or A5, when the acquired second detected value is outside a given range that includes the second detected value when the input device assumes the basic orientation, the operation amount determining unit selects the sensitivity characteristic pattern with a lower reaction sensitivity of the operation amount with respect to the first detected value than that occurring when the acquired second detected value falls within the given range.

A7. Another aspect of the present invention provides an operational sensitivity adjusting method for transferring a movement of an input device held by a user, as an operation amount, comprising: detecting magnitudes of a movement of the input device in given two directions respectively; determining an operational sensitivity with respect to the magnitude of the movement of the input device in one direction, in accordance with the movement of the input device in the other direction; and determining the operation amount corresponding to the movement in the one direction in accordance with the determined operational sensitivity.

A8. Another aspect of the present invention provides a program product for user interface processing causing a computer to execute the functions, comprising: acquiring a first detected value representing a magnitude of a movement in a first direction and a second detected value representing the magnitude of the movement in a second direction that is different from the first direction from an input device for transferring the movement of a user's hand holding a device main body as the operation amount, the sensor being built in the input device; storing a plurality of sensitivity characteristic patterns different in reaction sensitivity of the operation amount with respect to the first detected value; and selecting the sensitivity characteristic pattern in accordance with the second detected value, referring to the selected sensitivity characteristic pattern, and determining the operation amount corresponding to the first detected value acquired.

What is claimed is:

1. A user interface apparatus comprising:

an input unit, which acquires an acceleration value detected from a sensor of an input device of a movement of the body of the input device;

an operation history storage unit, which retains, for a history period measured from a present time minus a predetermined amount of time in the past, the detected acceleration value of the input unit as part of operation history data on the movement of the body of the input device by the user;

a pattern storage unit, which stores a plurality of sensitivity characteristic patterns, each of which having minimum and maximum threshold values to measure different reaction sensitivity based on detected movement of the body of the input device by a user when measured against the acquired detected acceleration value, wherein a current sensitivity characteristic pattern is selected to adjust an operation amount to be applied to a movement within a virtual environment;

an operation amount determining unit, which continuously monitors the operation history data retained within operation history storage unit, wherein, the operation amount determining unit determines, within the history period, whether or not detected acceleration values retained as part of the operation history data exceed a given threshold value of the current sensitivity characteristic pattern a predetermined number of times;

a pattern selector, which selects a new sensitivity characteristic pattern when the operation amount determining unit determines that the given threshold value of the current sensitivity characteristic pattern has been exceeded a predetermined number of times within the history period;

an adjustor, which refers to the new sensitivity characteristic pattern thus selected and adjusts the operation amount to be applied to the movement within the virtual environment based on the new sensitivity characteristic pattern.

2. The user interface apparatus according to claim 1, further comprising a converter that converts the acceleration value from a sensor in accordance with a given rule,
wherein the pattern storage unit stores each of the plurality of sensitivity characteristic patterns of a user as a pattern in which the operation amount is associated with the acquired acceleration value subjected to conversion.

3. The user interface apparatus according to claim 1, wherein:
the input device includes a sensor adapted to detect as acceleration values the vector components of a magnitude vector of the movement of the body of the input device in a first direction and the vector components of a magnitude vector of the movement thereof in a second direction that is different from the first direction;
the input unit acquires the first direction vector components of the movement of the body of the input device as a first acceleration value and the second direction vector components of the movement of the body of the input device as a second acceleration value; and
the operation amount determining unit determines the operation amount with respect to the first acceleration value and the operation amount with respect to the second acceleration value based on the sensitivity characteristic patterns, each of which having a different reaction sensitivity from each other.

4. The user interface apparatus according to claim 1, wherein the pattern selector selects the sensitivity characteristic pattern in accordance with a change rate of the acceleration value.

5. The user interface apparatus according to claim 1, wherein the pattern selector selects the sensitivity characteristic pattern in accordance with the type of a game, in determining the operation amount of a graphics object in the game.

6. The user interface apparatus according to claim 1, wherein the pattern selector selects the sensitivity characteristic pattern in accordance with a game event generated by a game, in determining the operation amount of a graphics object in the game.

7. The user interface apparatus according to claim 1, wherein the pattern selector selects the sensitivity characteristic pattern in accordance with a virtual moving speed of a graphics object in a game environment, in determining the operation amount of the graphics object in the game environment.

8. The user interface apparatus according to claim 1, wherein the pattern selector selects any one of the plurality of the sensitivity characteristic patterns, each of which different with regards to a change rate of the operation amount with respect to a change in the acquired acceleration value.

9. The user interface apparatus according to claim 1, wherein the pattern selector selects any one of the plurality of the sensitivity characteristic patterns, each of which different in regards to a specified play range of movement in which the operation amount is not changed even when the acquired acceleration value changes through the movement of the body of the input device.

10. The user interface apparatus according to claim 1, wherein the adjustor further adjusts the selected sensitivity characteristic pattern so that a median value of an acquired acceleration value corresponds to a median value of the operation amount.

11. The user interface apparatus according to claim 1, wherein:
the input unit acquires from the sensor a first acceleration value representing the vector components of a magnitude vector of movement in a first direction and a second acceleration value representing the vector components of a magnitude vector of movement in a second direction that is different from the first direction, respectively;
the pattern storage unit stores the plurality of the sensitivity characteristic patterns that are different in the reaction sensitivity of the operation amount with respect to the first acceleration value;
the pattern selector selects the sensitivity characteristic pattern among the plurality sensitivity characteristic patterns in accordance with the second acceleration value acquired, and the adjustor refers to the selected sensitivity characteristic pattern and determines the operation amount corresponding to the first acceleration value acquired.

12. The user interface apparatus according to claim 11, wherein:
the sensor included in the input device is adapted to detect the magnitude of a rotational angle about a first given axis of the input device and the magnitude of the rotational angle about a second given axis of the input device, respectively; and
the input unit acquires the magnitude of the rotational angle about the first given axis of the input device as a first acceleration value and the magnitude of the rotational angle about the second given axis of the input device as a second acceleration value, respectively.

13. An operational sensitivity adjusting method for transferring an operation amount based on a movement of a body of an input device by a user comprising:
acquiring an acceleration value detected from a sensor of the input device of a movement of the body of the input device;
retains, for a history period measured from a present time minus a predetermined amount of time in the past, the detected acceleration value as part of operation history data on the movement of the body of the input device;
monitoring continuously the operation history data retained to determine, within the history period, whether or not detected acceleration values retained as part of the operation history data exceed a given threshold value a predetermined number of times;
selecting, by a processor, a new operation amount when the given threshold value is determined to be exceeded a predetermined number of times within the history period;
adjusting, by the processor, the movement within the virtual environment with the new operation amount.

14. A non-transitory computer-readable medium with a program product thereon for user interface processing, the program product comprising:
a module, which acquires an acceleration value detected from a sensor of the input device of a movement of the body of the input device;
a module, which retains in a memory, for a history period measured from a present time minus a predetermined amount of time in the past, the detected acceleration value as part of operation history data on the movement of the body of the input device by the user;
a module, which stores in a memory a plurality of sensitivity characteristic patterns, each of which having minimum and maximum threshold values to measure different reaction sensitivity based on detected movement of the body of the input device by a user when measured against the acquired detected acceleration value, wherein a current sensitivity characteristic pattern is selected to adjust an operation amount to be applied to a movement within a virtual environment;

a module, which continuously monitors the operation history data retained within the memory, wherein a determination is made within the history period, whether or not detected acceleration values retained as part of the operation history data exceed a given threshold value of the current sensitivity characteristic pattern a predetermined number of times;

a module, which selects a new sensitivity characteristic pattern when it is determined that the given threshold value of the current sensitivity characteristic pattern has been exceeded a predetermined number of times within the history period;

a module, which refers to the new sensitivity characteristic pattern thus selected and adjusts the operation amount to be applied to the movement within the virtual environment based on the new sensitivity characteristic pattern.

* * * * *